US009118665B2

(12) United States Patent
Krahn et al.

(10) Patent No.: US 9,118,665 B2
(45) Date of Patent: Aug. 25, 2015

(54) AUTHENTICATION SYSTEM AND METHOD (75) Inventors: Darren Krahn, Kanata (CA); Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 1410 days.

(21) Appl. No.: 12/078,498

(22) Filed: Apr. 1, 2008

(65) Prior Publication Data

US 2008/0263352 A1   Oct. 23, 2008

Related U.S. Application Data (60) Provisional application No. 60/907,814, filed on Apr. 18, 2007.

(51) Int. Cl.
| | |
|---|---|
| G06F 12/14 | (2006.01) |
| H04L 29/06 | (2006.01) |
| G06F 21/34 | (2013.01) |
| G06F 21/42 | (2013.01) |

(52) U.S. Cl.
CPC ............ *H04L 63/0853* (2013.01); *G06F 21/34* (2013.01); *G06F 21/42* (2013.01); *H04L 63/1466* (2013.01); *H04L 63/1483* (2013.01); *G06F 2221/2115* (2013.01); *G06F 2221/2119* (2013.01); *H04L 63/0823* (2013.01); *H04L 63/0869* (2013.01); *H04L 63/1441* (2013.01); *H04L 63/166* (2013.01)

(58) Field of Classification Search
CPC ......... G06F 21/34; G06F 21/45; G06F 21/46; H04L 63/0853; H04L 63/1483; H04L 9/3234
USPC .......................................................... 726/9
See application file for complete search history.

(56) References Cited

U.S. PATENT DOCUMENTS

| | | | |
|---|---|---|---|
| 4,200,770 A | 4/1980 | Hellman et al. | |
| 5,265,163 A * | 11/1993 | Golding et al. | 726/19 |
| 5,347,580 A * | 9/1994 | Molva et al. | 713/159 |
| 5,784,463 A * | 7/1998 | Chen et al. | 713/171 |
| 5,953,422 A * | 9/1999 | Angelo et al. | 713/185 |
| 6,539,093 B1 * | 3/2003 | Asad et al. | 380/279 |
| 6,643,783 B2 * | 11/2003 | Flyntz | 726/9 |

(Continued)

FOREIGN PATENT DOCUMENTS

| | | |
|---|---|---|
| WO | 2004/008676 A2 | 1/2004 |
| WO | 2005/098630 A1 | 10/2005 |

(Continued)

OTHER PUBLICATIONS

Anonymous, "Smart Dongle: Feeling at home. Everywhere." Gemalto Telecommunications White Paper; Feb. 2007, pp. 1-16.*

(Continued)

*Primary Examiner* — Tamara T Kyle
(74) *Attorney, Agent, or Firm* — Dorsey & Whitney LLP (57) ABSTRACT

A security protocol for use by computing devices communicating over an unsecured network is described. The security protocol makes use of secure data provided to a peripheral memory device from a server via a secure connection. When the peripheral memory device is coupled to a computing device that attempts to establish a secure connection to the server, the secure data is used to verify that the server is authentic. Similarly, the secure data assists the server in verifying that the request to access the server is not being made by a malicious third party.

7 Claims, 5 Drawing Sheets

(56) References Cited

U.S. PATENT DOCUMENTS

| | | | |
|---|---|---|---|
| 6,895,502 B1* | 5/2005 | Fraser | 713/168 |
| 7,134,138 B2* | 11/2006 | Scherr | 726/2 |
| 7,191,466 B1 | 3/2007 | Hamid et al. | |
| 7,299,364 B2* | 11/2007 | Noble et al. | 713/189 |
| 7,694,331 B2* | 4/2010 | Vesikivi et al. | 726/9 |
| 7,779,267 B2* | 8/2010 | Chen et al. | 713/185 |
| 8,255,680 B1 | 8/2012 | Gong | |
| 2002/0147924 A1* | 10/2002 | Flyntz | 713/200 |
| 2002/0194499 A1* | 12/2002 | Audebert et al. | 713/201 |
| 2004/0039925 A1 | 2/2004 | McMillan et al. | |
| 2005/0071282 A1* | 3/2005 | Lu et al. | 705/64 |
| 2006/0294023 A1* | 12/2006 | Lu | 705/67 |
| 2007/0101405 A1* | 5/2007 | Engle et al. | 726/4 |
| 2007/0118745 A1 | 5/2007 | Buer | |
| 2007/0223685 A1* | 9/2007 | Boubion et al. | 380/2 |
| 2007/0226787 A1* | 9/2007 | Maletsky et al. | 726/9 |
| 2008/0028228 A1* | 1/2008 | Mardikar et al. | 713/184 |
| 2008/0060060 A1* | 3/2008 | Hamid | 726/4 |
| 2008/0098466 A1 | 4/2008 | Yoshida et al. | |
| 2008/0212771 A1* | 9/2008 | Hauser | 380/44 |
| 2008/0270791 A1* | 10/2008 | Nystrom et al. | 713/159 |
| 2010/0050251 A1 | 2/2010 | Speyer et al. | |
| 2010/0115594 A1* | 5/2010 | Paya et al. | 726/5 |
| 2011/0125613 A1* | 5/2011 | Franchi | 705/27.1 |
| 2011/0307383 A1 | 12/2011 | Ratica | |
| 2012/0166576 A1 | 6/2012 | Orsini et al. | |
| 2013/0061310 A1 | 3/2013 | Whitmyer, Jr. | |
| 2013/0145173 A1 | 6/2013 | Shablygin et al. | |
| 2013/0247163 A1 | 9/2013 | Ganem | |

FOREIGN PATENT DOCUMENTS

| | | |
|---|---|---|
| WO | 2007/017878 A2 | 2/2007 |
| WO | 2011/116459 A1 | 9/2011 |

OTHER PUBLICATIONS

Parno, Bryan et al. "Phoolproof Phishing Prevention," *Financial Cryptography and Data Security Lecture Notes in Computer Science*; LNCS, Springer, Berlin, Germany, pg. 1-19 (Jan. 1, 2006).

* cited by examiner

AUTHENTICATION SYSTEM AND METHOD

FIELD OF THE INVENTION

The invention relates to an authentication system for use in computer networks. More specifically, the invention relates to the authentication across an unsecured communications link.

BACKGROUND

Retail business over the Internet has expanded rapidly since it began. Although many transactions occur via public data networks many consumers fear providing their credit card information to their computer. In many cases these fears are well founded.

Today, a common approach to acquiring people's information without their knowledge is using a method known as phishing. This technique involves finding a company webpage that allows a user to access money or credit, such as the webpage of a bank. The hacker then provides a false webpage that resembles the company webpage for use in convincing a user that they are at the company web site. This webpage simply receives client identification information and client password information. The hacker then provides an email message to a person that the hacker hopes is a client of the company. The email provides the webpage address for the false webpage provided by the hacker and an indication that the client should click on a link that leads to the false webpage and sign in. The client does so, thereby providing their username and password to the hacker. The false webpage transfers this data to the hacker or alternatively, uses this data to access the money or credit available. In this way, the hacker is able to gain information and/or assets relating to the client. Once the user name and password information is known, it is a simple matter for the hacker to impersonate the client at the real webpage of the business and take advantage of assets of the client.

It would be beneficial to provide a system that provides robust authentication. It would be particularly beneficial if such a system were resistant to "phishing" attacks.

SUMMARY OF EMBODIMENTS OF THE INVENTION

According to an aspect of the invention there is provided a method comprising: providing a secure data communication path between a server and a computer readable memory that is non-volatile; storing secure data on the computer readable memory; after storing the secure data, severing the secure data communication path; providing a communications path via an unsecured network between the server and a client computing device in data communication with the computer readable memory; verifying an identity of the server in dependence upon the secure data stored within the computer readable memory.

According to an aspect of the invention there is provided a method comprising: providing a memory storage device to a user, the memory storage device having trusted secure data stored thereon; providing a web server for supporting a first authentication process and a second authentication process; accessing the web server via an unsecured connection; requesting security information determined in dependence upon the secure data; and at least one of: providing first security information associated with the user, the first security information other comprising data determined in dependence upon the secure data; determining if the first security information is valid; when the first security information is valid, authenticating the user to a first security threshold; and, when the first security information is other than valid other than authenticating the user; and, providing second security information comprising the first security information and data determined in dependence upon the secure data; determining if the second security information is valid; when the second security information is valid, authenticating the user to second security threshold; and, when the second security information is other than valid other than authenticating the user to the second security threshold.

According to an aspect of the invention there is provided a method comprising: providing a memory storage device to a user, the memory storage device having trusted secure data stored thereon; providing a web server for supporting a first authentication process and a second authentication process; in response to receiving a request for security information determined in dependence upon the secure data, performing at least one of: a first authentication comprising: providing first security information associated with the user, the first security information other than comprising data determined in dependence upon the secure data; determining if the first security information is valid; when the first security information is valid, authenticating the user to a first security threshold; and, when the first security information is other than valid other than authenticating the user; and, a second authentication comprising: providing second security information comprising the first security information and data determined in dependence upon the secure data; determining if the second security information is valid; when the second security information is valid, authenticating the user to second security threshold; and, when the second security information is other than valid other than authenticating the user to the second security threshold.

BRIEF DESCRIPTION OF THE DRAWINGS

Embodiments of the invention are now described with references to the drawings in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
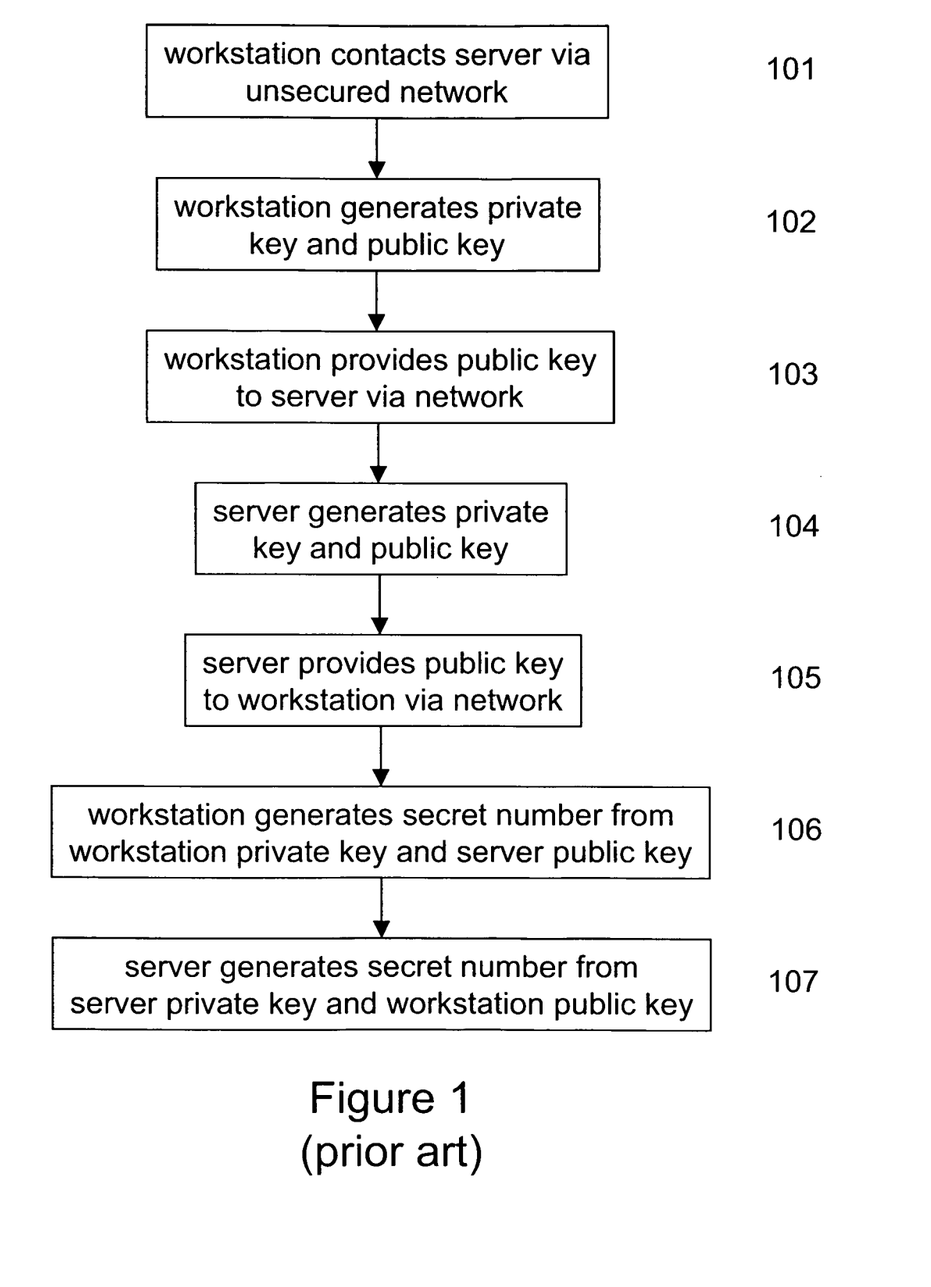
FIG. 1 is a flowchart describing transferring secure data using a public key private key system.

Referring to FIG. 1, a flowchart describing a prior art public key and private key protocol is shown. For ease of understanding, a first party is referred to as a workstation and the second party is referred to as a server. At 101 the workstation establishes a data communication path with the server via an unsecured network, such as for instance the Internet. The workstation and the server agree to a security procedure relying upon session keys. At 102 the workstation generates a workstation private key/public key pair. The workstation private key is a secret number known only to the workstation. The workstation provides the workstation public key and parameter data to the server. At 103 the server receives the workstation public key, and then at 104 the server produces a server private key/public key pair in dependence upon the parameter data. The server public key is then provided to the workstation at 105. This exchange of data is sufficient that both the workstation and the server are able to generate one or more session keys at steps 106 and 107, respectively. A third party having access to the data being transmitted will not have sufficient information to easily determine the session key. For example, Diffie-Hellman key exchange is a commonly known process that uses an exchange of data over an unsecured network to support session key generation. The Diffie-Hellman key exchange is described by Hellman et al. in U.S. Pat. No. 4,200,770, the entire contents of which is incorporated herein by reference.

Figure 2:
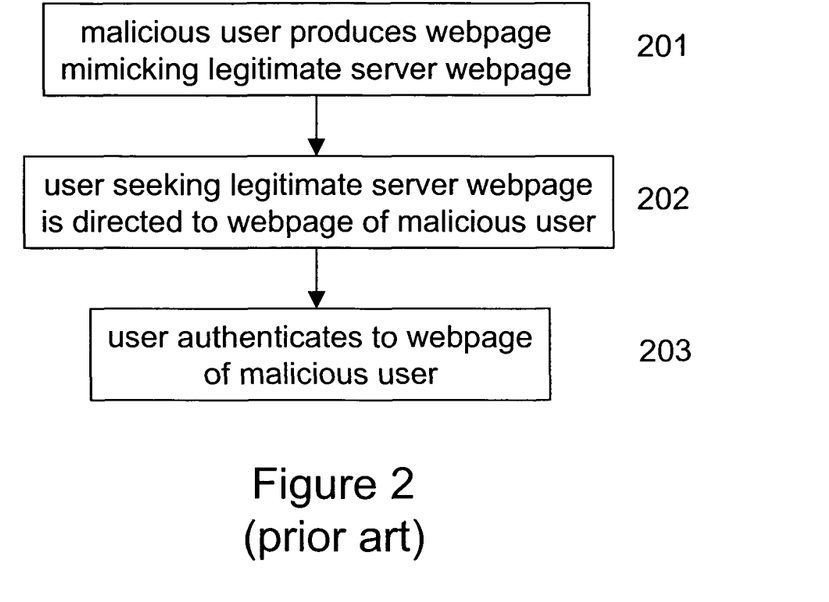
FIG. 2 is a flowchart of a system according to FIG. 1 in which a malicious user mimics a legitimate party.

Referring now to FIG. 2, a flowchart of a first phishing method used by a malicious third party is shown. In order to overcome the security system described with reference to FIG. 1, the third party generates at 201 a mimicking webpage designed to deceive a first party, the user, into believing that the mimicking webpage represents a legitimate server webpage of a second party. At 202 the user is directed to the mimicking webpage of the third party. Optionally, the mimicking webpage also mimics the security process used by the server and generates public and private keys in accordance with the process described with reference to FIG. 1. When the user provides data to the mimicking webpage, the system supporting the mimicking webpage stores the data and thus is provided with usernames and passwords for accessing systems that it is not authorized to access. Here, the third party places themselves between the workstation and the server, thereby intercepting workstation messages and server messages. Such a man-in-the-middle attack allows the malicious third party to listen and potentially modify data transmitted between the workstation and the server.

Figure 3:
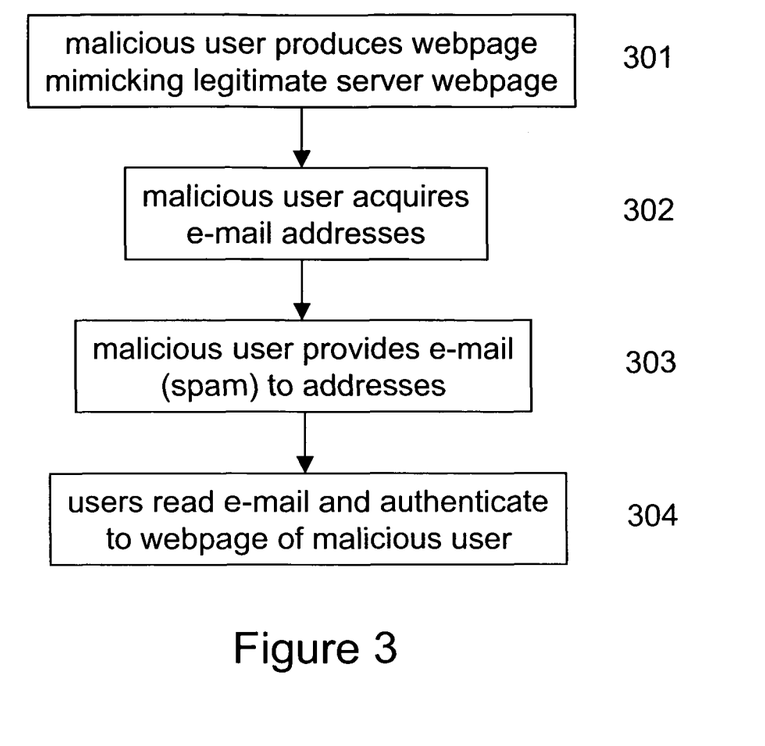
FIG. 3 is a flowchart describing a phishing attack.

Referring to FIG. 3, a flowchart generally describing a simpler "phishing" attack is shown. The phishing attack provides a means for causing a user to attempt to authenticate to a bogus server. A simple phishing attack often involves a malicious user reserving a uniform resource locator (URL) that is similar to a uniform resource locator URL of a legitimate business, though this need not be so. At 301 the malicious user produces a mimicking webpage that simulates the legitimate webpage of a business. The mimicking webpage also simulates the security process carried out by the webpage of the legitimate business. At 302 the malicious user acquires a large number of email addresses and at 303 provides a message to each address falsely indicating that the conventional webpage of the legitimate business is unavailable and that users have been requested to login at 304 to an alternative webpage corresponding the URL of the mimicking webpage. Alternatively, the malicious user awaits access to their site accidentally and capitalizes on those access attempts. The malicious user then optionally uses security information provided by the unwary users to make unauthorized transactions with the legitimate business via the legitimate webpage which has been mimicked. A most obvious target for a phishing attack is banking clients who do online banking.

It will be apparent to one of skill in the art that both the MIM attack described with reference to FIG. 2 and the phishing attack described with reference to FIG. 3 involve mimicking a first computing device in order to gain information from a user via the user's computing device. Clearly, it is a simple matter to load a webpage, copy hypertext markup language (HTML) code used to provide the webpage and provide data that is easily confused with the actual webpage. Another method for gaining access to secure information involves providing eavesdropping software on the computing device of a user, referred to as a Trojan. For example, a computer virus running on a computing device of the user monitors all of the keystrokes that the user provides and stores the keystroke information. In this way, the computer virus receives and records password information provided by the user. This keystroke information is uploaded to a malicious user. The malicious user then tries to use this password information to gain access to secure information and other online resources of the user.

Figure 4:
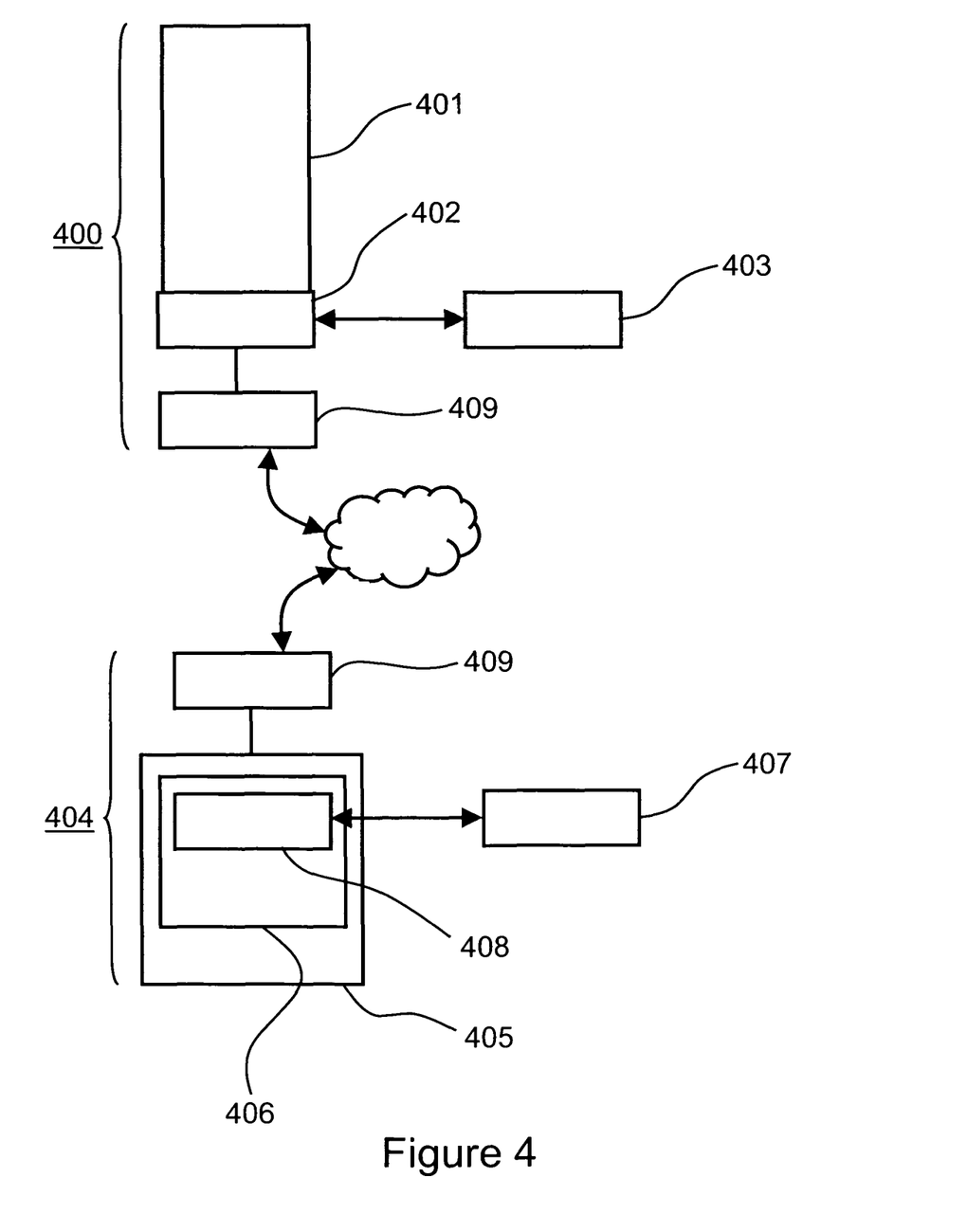
FIG. 4 is a schematic diagram describing hardware and software used to carry out a method according to an embodiment of the instant invention; and, FIG. 5 is a flowchart according to the first embodiment of the invention.

Referring to FIG. 4 a simplified schematic diagram indicating a variety of firmware elements supporting communication between a computing device supporting a web browser and a web server are shown in accordance with an embodiment of the invention. A web server 401 comprises a security filter 402 that serves to review and modify data incident the web server 401. The security filter 402 communicates with a security service 403. These elements are provided on a server side 400. A client side 404 comprises a client system 405 supporting a web browser 406 comprising a security plugin 408. A peripheral memory storage device 407 is shown coupled to the client system 405. The client side 404 and server side 400 are shown communicating using secure socket layer (SSL) encryption 409. In this embodiment the peripheral memory storage device 407 is coupled to the client system 405 via a universal serial bus (USB) interface; however other interfaces are also suitable.

Figure 5:
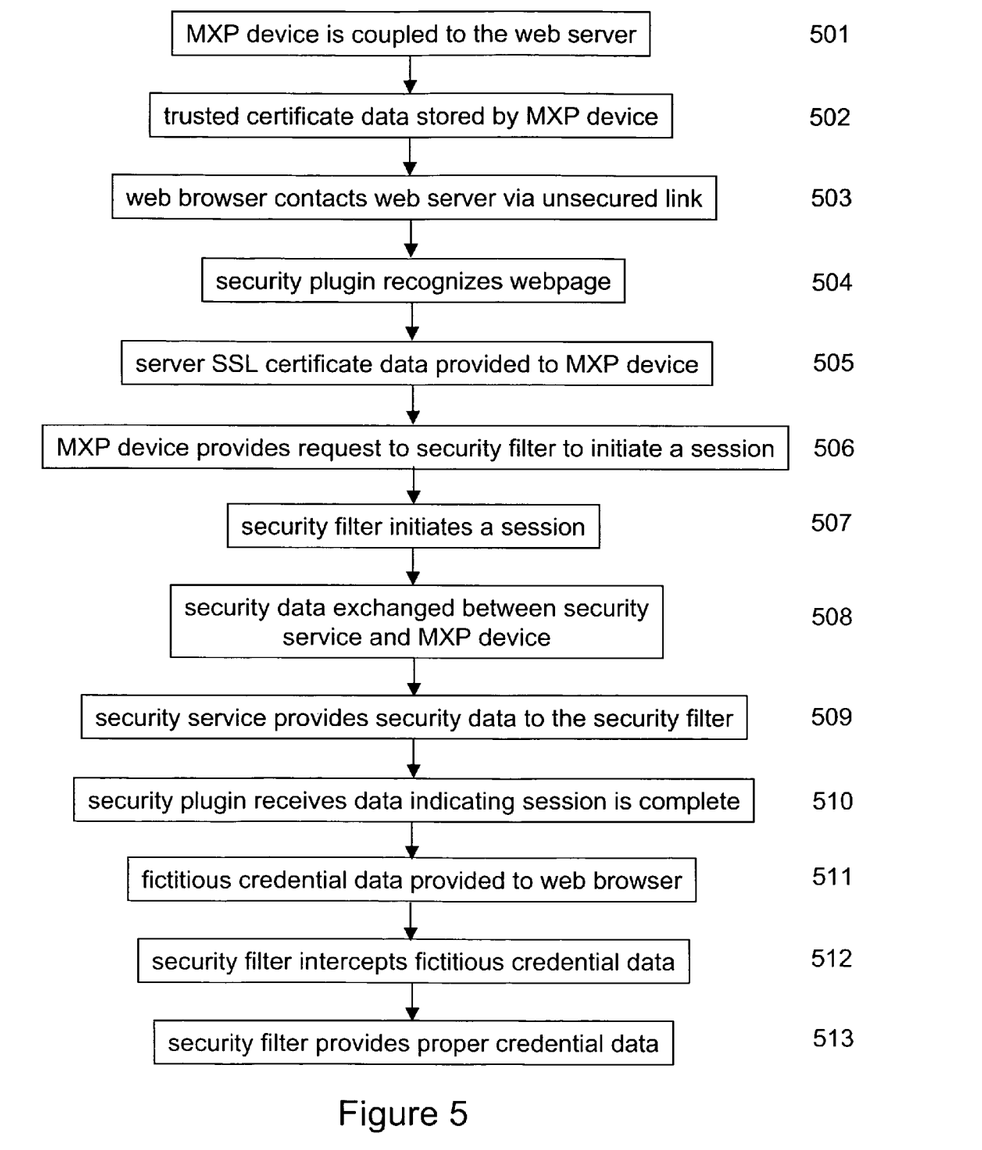

Referring to FIG. 5 a flowchart describing the flow of communication in FIG. 4 is provided. According to the method, a peripheral memory storage device is data coupled to a web server via a secure connection at step 501. At 502 trusted certificate data is transferred to the peripheral memory storage device and is stored in a non-volatile memory thereof. In this way, the peripheral memory storage device stores data associated with the web server that is secret and not available via unsecured networks. The secure connection is then decoupled. At 503 a web browser establishes contact with the web server via an unsecured network. At 504 a security plugin receives webpage data from the web server and determines that the webpage is a recognized webpage. The security plugin sends server SSL certificate data to the peripheral memory storage device at step 505. The peripheral memory storage device determines if the SSL certificate data corresponds to the trusted certificate data, and when the data corresponds the peripheral memory storage device provides a request to initiate a session to the security filter at step 506. The security filter receives the request, determines if the request is valid in dependence upon the SSL certificate data, and when the request is determined to be valid, the security filter initiates a session at step 507. The security service then establishes a secure communication path to the peripheral memory storage device and security data is exchanged at step 508. The security data from the peripheral memory storage device is verified to be authentic by the security service and security data provided by the security service is verified to be authentic by the peripheral memory storage device. The security service provides security data to the security filter at step 509. When both sets of security data are authenticated the session is successfully completed. When the security data is not authenticated the session is terminated and thus, a request to transfer secure data is denied. Data indicative of the session being completed successfully is then sent to the security plugin at step 510. The security plugin provides fictitious credential data to the web browser at step 511. The web browser directs the fictitious credential data to the web server where the security filter receives it at step 512 without allowing the web server to process the fictitious credential data. The security filter then provides proper credential data associated with the peripheral memory storage device to the web server at step 513.

The MIM attack and the phishing attack both rely on a user making efforts to initiate a secure session with a desired web server but authenticating to another computing device that is mimicking the desired web server. In both cases, the mimicking computing device is almost certainly not in possession of the correct data to recognize a peripheral memory storage device coupled to the computing device of the user. Thus, even if the user has never accessed the desired web server from their computing device, since the peripheral memory storage device has trusted certificate data stored in memory it is able to provide information to the desired web server that is indicative of the trusted certificate data, thereby associating the known peripheral memory storage device with secure data available to the desired web server. Once data indicative of the trusted certificate data is provided to the web server, the web server responds by providing other data that the peripheral memory storage device is able to determine as being associated with the trusted certificate data. As such, a person of skill in the art will appreciate that maintaining the trusted certificate data secret is critical to ensuring that the security protocol described by the method is not compromised. Clearly, if a malicious user were to obtain data transmission between the computing device of the user and the legitimate web server it would be possible to use this data to mimic the client system including that data indicative of the trusted certificate data within the peripheral memory storage device. In order to reduce the likelihood of such a replay attack being successful a pseudo-random nonce is provided along with critical data. More specifically, when security information is exchanged, it is provided along with a pseudo-random nonce. When a nonce is being reused, as per a replay attack, the receiving device optionally requests a repetition of the authentication process until a nonce it has not received from the party wishing to be authenticated is provided. Such techniques are well understood by those of skill in the art. Indeed there are a wide variety of techniques for processing data that serve to ensure that it is not useful in a replay attack.

As the flowchart of FIG. 5 relies upon data communication between the peripheral memory storage device and the server it is insufficient to authenticate to the sever by only providing correct user identification information along with a corresponding password. Thus, even if a malicious user is able to monitor and duplicate what the user does in order to authenticate themselves, without the correct secure data stored within the peripheral memory storage device, the malicious user will have difficulty in authenticating to the server.

According to an embodiment of the instant invention, a user receives a banking card at a branch of their bank. The branch has access to a secure device that provides a trusted certificate data to the card. The card comprises a processor, a non-volatile memory and a computer interface that allows the user to couple the card to a personal computer that they use for online banking. When the user wishes to do their banking online, they simply connect their card to a computing device and access their account on the server via a public network, such as the Internet. The enhanced security provided by the method complicates efforts to phish—to make the user authenticate to any server other than the correct server. Similarly, without the card, one cannot access a secure account on the server. Optionally, a subset of the automated teller machines (ATMs) supported by the bank are known to be secure devices and coupling the bank card to one of these ATMs allows the bank to update secure certificate information stored on the bank card.

A person of skill in the art will appreciate that the firmware described with reference to FIG. 4 represents a suggested set of hardware and software that support the method. Clearly other hardware and software configurations are applicable to the method or variations thereof that will be apparent to one of skill in the art. For example, the peripheral memory storage device is described as having a USB interface. Such an interface is chosen because it is ubiquitous. Clearly, other hardware configurations also function such as a smart card, a peripheral interface, a serial interface, a firewire interface, a SCSI interface, a PCMCIA interface and so forth. Further, the peripheral memory storage device is optionally provided as a discreet circuit board with a standard internal interface such as an ISA interface. Alternatively, the device is in the form of a PROM for insertion within a discreet circuit board. Further alternatively, the device is a wireless communication device for operating with circuitry of a computer system whether internal, peripheral, or removably couplable therewith. In this way, the user need not couple their peripheral memory storage device to the computing device.

Alternatively, in order to further enhance security, the peripheral memory storage device is configured to receive biometric data, such as a fingerprint, from a user during the authentication process such that a malicious user is inhibited from impersonating a legitimate user even if they obtain a peripheral memory storage device assigned to the legitimate user.

The web server optionally maintains a record of all peripheral memory storage devices that it recognizes and authentication data associated with each one. Thus, when a peripheral memory storage device is reported as stolen or missing it is a simple matter for a system administrator to remove the data associated with that peripheral memory storage device from the web server. The tracking of the peripheral memory storage device is analogous to the tracking of conventional passwords and therefore a person of skill in the art of managing passwords for secure applications will appreciate that a wide variety of password management and protection processes and tools are optionally adapted for this use.

It will be appreciated by one of skill in the art that the method according to the first embodiment of the invention is applicable to highly secure data. In some cases it is desirable to reduce the level of security associated with an authentication process but provide a reduced level of access. For example, if the user is unable to access their peripheral memory storage device because it has been lost or damaged it may still be desirable to provide some access to the user. Thus, a user may allow online access to their bank account once for a maximum of, for example, $200 absent the peripheral memory storage device. In this way, if the user is in an emergency situation where they require money and the peripheral memory storage device is unavailable, the user is still able to access this minimal level of funds. Once the funds have been accessed the account is optionally flagged such that no other access is granted to it absent the peripheral memory storage device or an initialization of a new security procedure.

Thus, a credit company provides their customers with credit cards that are peripheral memory storage devices. When the user wishes to use their credit card a bi-directional communication authentication scheme is followed in accordance with FIG. 5. In the event that the credit company server is temporarily unavailable, the user is still able to make purchases that fall below a first credit threshold. When the credit card is available and the authentication procedure is successfully completed the user is granted access to credit according to a second credit threshold. While this does allow a malicious person who obtains certain user credit card information to make a small transaction it inhibits such a person from making a large transaction. In the event that an unauthorized third party knows the authentication information of the user it is desirable to provide new authentication information. Thus, the credit card supports two distinct levels of authentication that use the same authentication information.

Numerous embodiments of the invention will be apparent to one of skill in the art without departing from the spirit and scope of the invention.

What is claimed is:

1. A method comprising:
   providing a secure data communication path between a server and a computer readable memory that is non-volatile;
   storing secure data from the server on the computer readable memory;
   after storing the secure data, severing the secure data communication path;
   providing a communications path via an unsecured network between the server and a client computing device in data communication with the computer readable memory;
   verifying an identity of the server in dependence upon the secure data stored within the computer readable memory;
   verifying an identity of the computer readable memory in dependence upon the secure data;
   providing fictitious credential data from the client computing device to the server, wherein a security filter receives the fictitious credential data at without allowing the server to process the fictitious credential data, the security filter providing legitimate credential data associated with the computer readable memory to the server in place of the fictitious credential data;
   wherein said secure data from said server is stored on said computer readable memory while said computer readable memory is not coupled to said client computing device.

2. A method according to claim 1 comprising:
   providing a peripheral memory storage device comprising the computer readable memory and an interface for supporting data communication between the computer readable memory and the client computing device;
   wherein said data communication between the computer readable memory and the client computing device occurs only after said secure data is stored on said computer readable memory.

3. A method according to claim 2 wherein the interface is a USB interface.

4. A method according to claim 1 comprising:
   upon verifying an identity of the server, initiating a security protocol comprising a generating of private key data and an exchange of public key data, the public key data generated in dependence upon the private key data.

5. A method according to claim 1 wherein verifying an identity of the server comprises receiving encrypted data from the server, the encrypted data encrypted according to a predetermined protocol and encrypted in dependence upon a pseudo random nonce.

6. A method according to claim 1 wherein the secure data comprises an indication of the server address.

7. A method according to claim 6 wherein the secure data comprises an indication of user authentication data for a user for accessing a service, one of the service and an authentication process for accessing the service accessible at the server address.

* * * * *

UNITED STATES PATENT AND TRADEMARK OFFICE
CERTIFICATE OF CORRECTION

PATENT NO. : 9,118,665 B2
APPLICATION NO. : 12/078498
DATED : August 25, 2015
INVENTOR(S) : Darren Krahn et al.

It is certified that error appears in the above-identified patent and that said Letters Patent is hereby corrected as shown below:

In the Claims:

At column 7, line 37 (Claim 1, Line 20):
"credential data at without allowing"

should read:
--credential data without allowing--

Signed and Sealed this
Twenty-third Day of August, 2016

Michelle K. Lee
*Director of the United States Patent and Trademark Office*